US008279184B2

(12) United States Patent
Lowles et al.

(10) Patent No.: US 8,279,184 B2
(45) Date of Patent: Oct. 2, 2012

(54) ELECTRONIC DEVICE INCLUDING A TOUCHSCREEN AND METHOD

(75) Inventors: Robert J. Lowles, Waterloo (CA); ZhongMing Ma, Waterloo (CA); Kuo-Feng Tong, Waterloo (CA)

(73) Assignee: Research In Motion Limited, Waterloo (CA)

( * ) Notice: Subject to any disclaimer, the term of this patent is extended or adjusted under 35 U.S.C. 154(b) by 913 days.

(21) Appl. No.: 12/360,207

(22) Filed: Jan. 27, 2009

(65) Prior Publication Data

US 2010/0188371 A1    Jul. 29, 2010

(51) Int. Cl.
*G06F 3/041* (2006.01)

(52) U.S. Cl. ...................................................... 345/173
(58) Field of Classification Search ................... 345/173
See application file for complete search history.

(56) References Cited

U.S. PATENT DOCUMENTS

| 6,411,283 | B1 * | 6/2002 | Murphy ........................ 345/173 |
| 8,115,731 | B2 * | 2/2012 | Varanda ........................ 345/156 |
| 2006/0097991 | A1 | 5/2006 | Hotelling et al. |
| 2006/0244735 | A1 * | 11/2006 | Wilson ............................ 345/173 |
| 2007/0097096 | A1 | 5/2007 | Rosenberg |
| 2008/0165152 | A1 | 7/2008 | Forstall et al. |
| 2008/0231608 | A1 | 9/2008 | Nagata |

FOREIGN PATENT DOCUMENTS

| EP | 2211256 A1 * | 7/2010 |
| WO | 2006/066435 A1 | 6/2006 |

OTHER PUBLICATIONS

Search Report dated Jun. 12, 2009.
Daniel Vogel and Patrick Baudisch, "Shift: A Technique for operating Pen-Based Interfaces Using Touch"; CHI 2007, Apr. 28-May 3, 2007, San Jose, California.
Hrvoje Benko, Andrew D. Wilson and Patrick Baudisch, "Precise Selection Techniques for Multi-Touch Screens"; CHI 2006, Apr. 22-28, 2006, Montreal, Quebec, Canada.
Par-Anders Albinsson and Shumin Zhai, "High Precision Touch Screen Interaction"; CHI 2003, Apr. 5-10, 2003, Ft. Lauderdale, Florida, USA.
Extended European Search Report dated Jan. 11, 2012, issued from corresponding European Patent Application No. 11192019.5.

* cited by examiner

*Primary Examiner* — My-Chau T Tran
(74) *Attorney, Agent, or Firm* — Geoffrey deKleine; Borden Ladner Gervais LLP

(57) ABSTRACT

A handheld electronic device having a touchscreen and a method of using a touchscreen of a handheld electronic device are provided. In accordance with one embodiment, there is provided a method of input using a touchscreen display of a handheld electronic device, comprising: displaying a graphical user interface (GUI) on the touchscreen display, the graphical user interface comprising a plurality of selectable user interface elements, each having an area of the touchscreen display associated herewith and each generating a respective input signal in response to selection thereof; detecting a touch input on the touchscreen display having a touch point; determining an orientation of the handheld electronic device; determining a touch offset in accordance with the orientation of the handheld electronic device; determining an adjusted touch point on the touch-sensitive input surface in accordance with the touch point and the touch offset; and generating an input signal associated with a respective user interface element displayed at the adjusted touch point when the adjusted touch point is associated with one of the plurality of selectable user interface elements in the graphical user interface.

20 Claims, 9 Drawing Sheets

Top up Device Orientation

Bottom up Device Orientation

Left up Device Orientation

Right up Device Orientation

Front up Device Orientation

Back up Device Orientation

ELECTRONIC DEVICE INCLUDING A TOUCHSCREEN AND METHOD

TECHNICAL FIELD

The present disclosure relates generally to input mechanisms for handheld electronic devices and, more particularly to a handheld electronic device having a touchscreen and a method of using a touchscreen of a handheld electronic device.

BACKGROUND

Touchscreens are sometimes used in personal data assistants (PDAs), mobile phones, digital cameras, video recorders and other types of handheld electronic devices. Touchscreens may be implemented using one of many different touchscreen technologies including, but not limited to, resistive, capacitive, infrared and surface acoustic wave (SAW) touchscreen technology. Depending on the type of touchscreen technology which is implemented, a touch input may be activated by a finger, stylus or both. A stylus can be cumbersome to use, particularly when using only one hand. Accordingly, users often prefer to use their fingers to interact with a touchscreen device, particularly with capacitive touchscreen where the conductive touch of a finger or a conductively tipped stylus is used to generate a touch input on the touchscreen.

Touchscreens on handheld electronic devices may provide an intuitive user interface, however incorporating touchscreens into handheld electronic devices also poses challenges. One problem is the small amount of space on the touchscreen which is available to display information for user selection, particularly when using a finger to make selections on the touchscreen. The graphical user interfaces provided by applications and functions on handheld electronic devices often feature small interactive user interface elements (such as small icons, virtual keys of virtual keyboard, menu list elements and text) which may be difficult to select with a fingertip. In addition, interactive user interface elements are often situated in close proximity to each other making it difficult to detect the desired input selection.

Thus, there remains a need for improved input mechanisms for handheld electronic devices, and in particular an improved handheld electronic device having a touchscreen and an improved method of using a touchscreen of a handheld electronic device.

BRIEF DESCRIPTION OF THE DRAWINGS

Like reference numerals are used in the drawings to denote like elements and features.

DETAILED DESCRIPTION OF EXAMPLE EMBODIMENTS

The embodiments described herein generally relate to portable electronic devices. Examples of portable electronic devices include mobile (wireless) communication devices such as pagers, cellular phones, Global Positioning System (GPS) navigation devices and other satellite navigation devices, smartphones, wireless organizers or personal digital assistants (PDA) and wireless-enabled notebook computers. At least some of these portable electronic devices may be handheld electronic devices. The portable electronic device may be a handheld electronic device without wireless communication capabilities such as a PDA, electronic gaming device, digital photograph album or picture frame, digital camera, or digital video recorder such as a camcorder. The portable electronic device comprises a touchscreen display and may comprise a mechanical keyboard in addition to the touchscreen display. These examples are intended to be non-limiting.

Figure 7A:
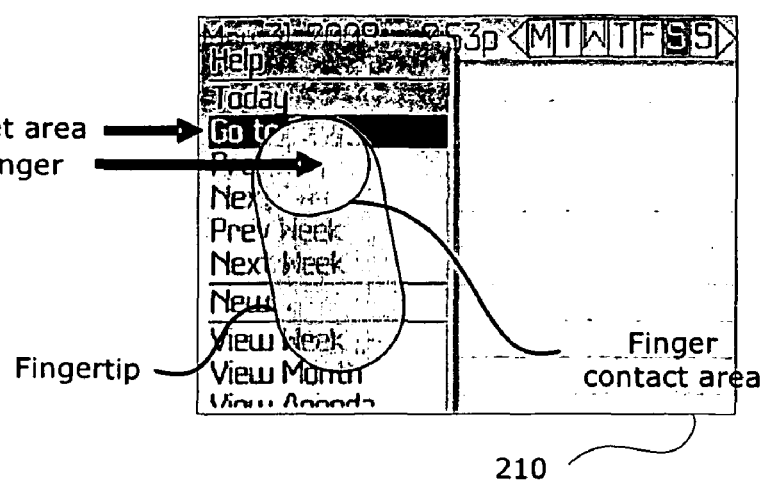
FIG. 7A illustrates a bar menu user interface of a touchscreen of a handheld electronic device in accordance with one embodiment of the present disclosure.
Figure 7B:
FIG. 7B illustrates an icon menu user interface of a touchscreen of a handheld electronic device in accordance with one embodiment of the present disclosure.
Figure 7C:
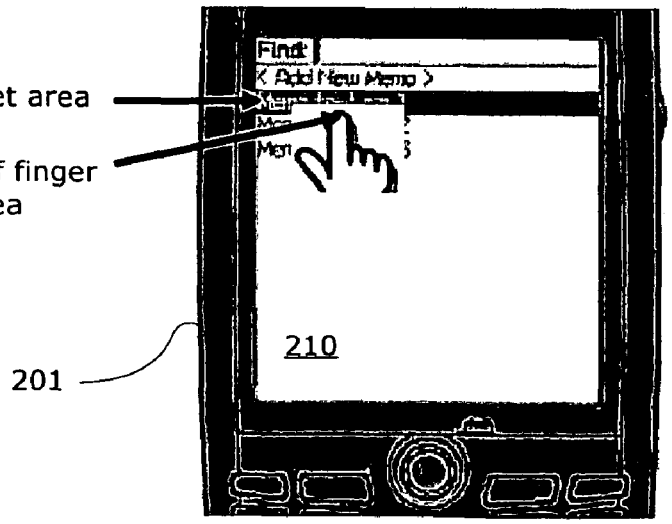
FIG. 7C illustrates a list user interface of a touchscreen of a handheld electronic device in accordance with one embodiment of the present disclosure.

Referring first to FIG. 7A to 7C, the concept of a touch offset will be briefly described. When selecting interactive user interface elements on a touchscreen of a handheld electronic device, whether using a finger, stylus or other input device, users have a tendency to press below the target area to avoid covering the target item (i.e., the target area). The area of a device user's fingertip which makes contact with the touchscreen is referred to as the finger contact area. As shown in FIG. 7A, the centroid of the finger contact area below the centroid of the target menu item (the menu bar) in the menu user interface. While not intending to be bound by any theory, it is believed that users touch below the contact area to avoid covering or occluding the user interface element or item they want to touch. Similarly, as shown in FIG. 7B and 7C, the centroid of the finger contact area is below the centroid of the target icon in the icon menu user interface of FIG. 7B, and the centroid of the finger contact area is below the centroid of the target item in the displayed list of FIG. 7C. When a contact or writing device such as a stylus is used to interact with the touchscreen rather than the device user's fingertip, similar behaviour of touching the touchscreen below the target is also seen.

The present disclosure provides a method and touchscreen-based handheld electronic device which compensates for the difference in position between the target area and the area of the touchscreen touched by the device user (the contact area) to improve touch input accuracy of the graphical user interface (GUI) of touchscreen based handheld electronic devices. A touch offset is used to adjust the location of the external (e.g. touch) measured by the touchscreen display to compensate for the difference in position between the target area and the actual contact area. To compensate for the changing orientation of the handheld electronic device, its orientation is detected continuously or at regular intervals and the touch offset is dynamically selected based on the device orientation detected at that time.

In accordance with one embodiment of the present disclosure, there is provided a method of input using a touchscreen display of a handheld electronic device, the method comprising: displaying a graphical user interface (GUI) on the touchscreen display, the graphical user interface comprising a plurality of selectable user interface elements, each having an area of the touchscreen display associated herewith and each generating a respective input signal in response to selection thereof; detecting a touch input on the touchscreen display having a touch point; determining an orientation of the handheld electronic device; determining a touch offset in accordance with the orientation of the handheld electronic device; determining an adjusted touch point on the touch-sensitive input surface in accordance with the touch point and the touch offset; and generating an input signal associated with a respective user interface element displayed at the adjusted touch point when the adjusted touch point is associated with one of the plurality of selectable user interface elements in the graphical user interface In accordance with another embodiment of the present disclosure, there is provided a handheld electronic device, comprising: a controller for controlling the operation of the device; a touchscreen display connected to the controller; and a position detection subsystem comprising a positional sensor connected to the controller which generates positional signals; the controller being configured to: (i) display a graphical user interface (GUI) on the touchscreen display, the graphical user interface comprising a plurality of selectable user interface elements, each having an area of the touchscreen display associated herewith and each generating a respective input signal in response to selection thereof; (ii) detect a touch input on the touchscreen display having a touch point; (iii) determine an orientation of the handheld electronic device; (iv) determine a touch offset in accordance with the orientation of the handheld electronic device; (v) determine an adjusted touch point on the touch-sensitive input surface in accordance with the touch point and the touch offset; and (vi) generate an input signal associated with a respective user interface element displayed at the adjusted touch point when the adjusted touch point is associated with one of the plurality of selectable user interface elements in the graphical user interface.

In accordance with a further embodiment of the present disclosure, there is provided a computer program product comprising a computer readable medium having stored thereon computer program instructions for implementing a method on a handheld electronic device for controlling its operation, the computer executable instructions comprising instructions for performing the method(s) set forth herein.

Figure 2:
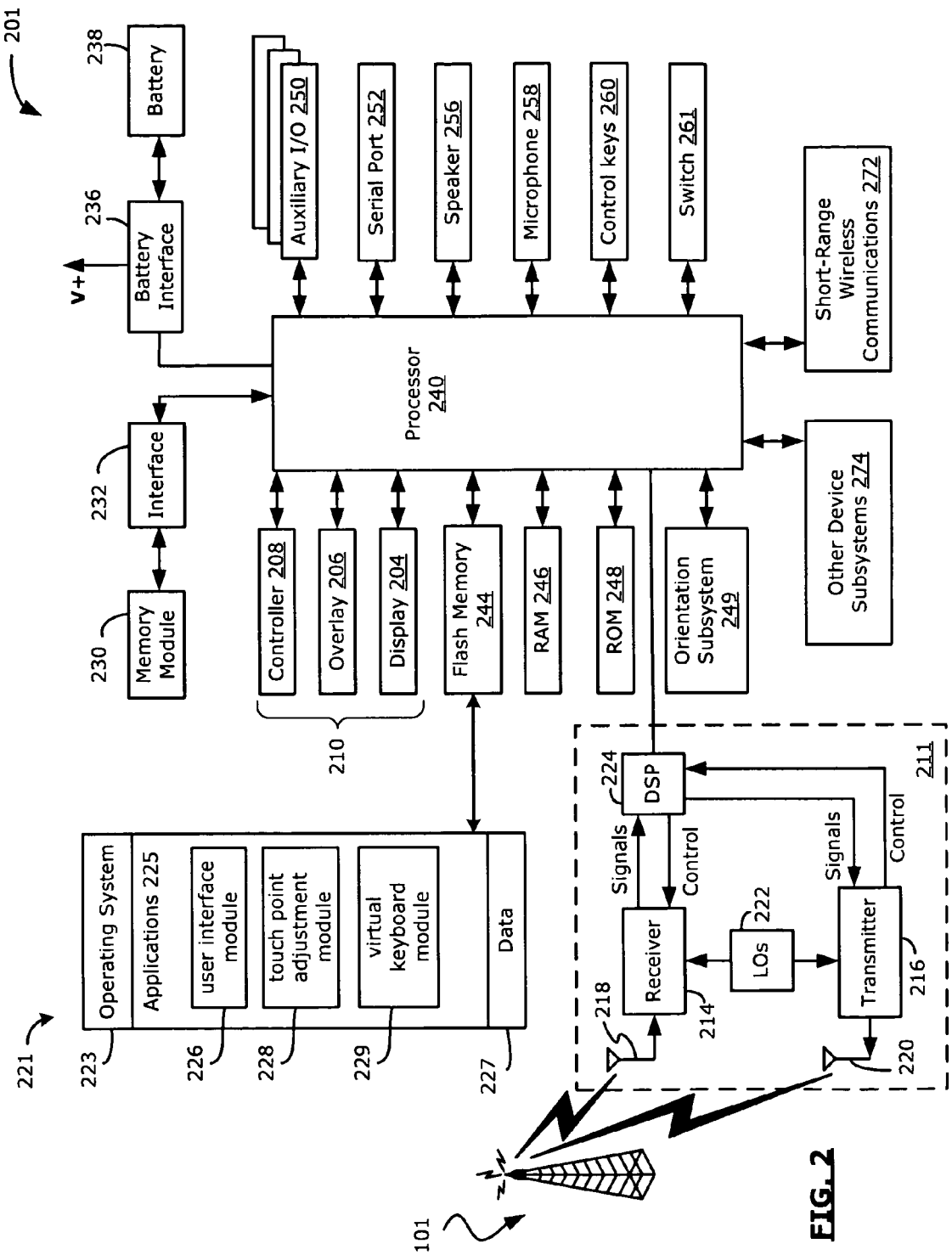
FIG. 2 is a block diagram illustrating a mobile communication device in accordance with one example embodiment of the present disclosure.
Figure 3:
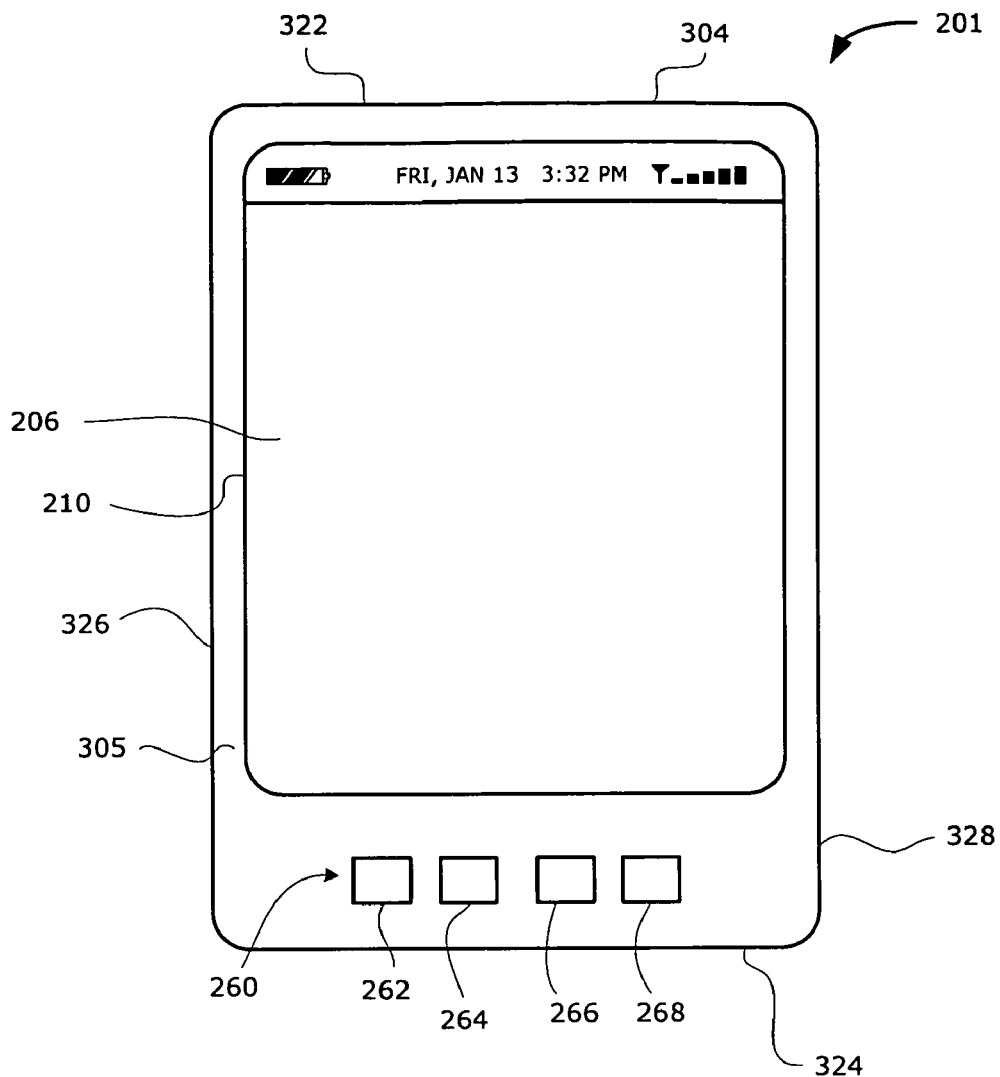
FIG. 3 is a front view of the mobile communication device of FIG. 2 in accordance with one example embodiment of the present disclosure.
Figure 4:
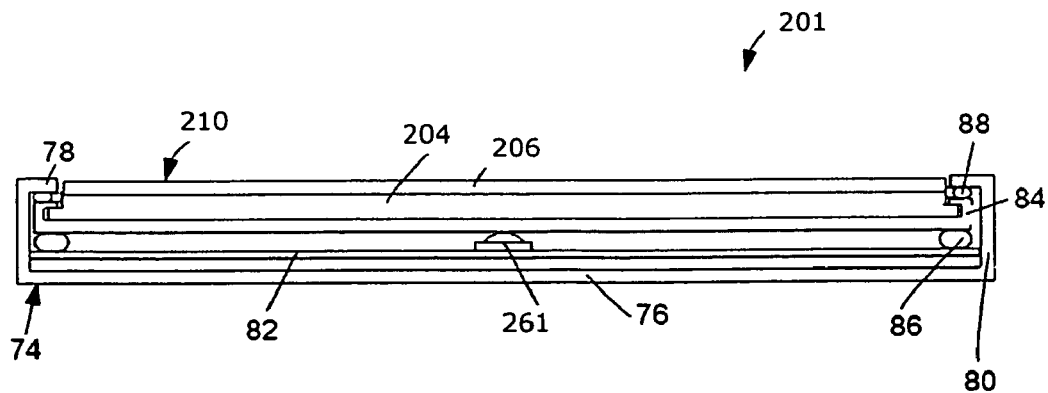
FIG. 4 is a simplified sectional view of the mobile communication device of FIG. 2 with the switch shown in a rest position.

Reference is now made to FIGS. 2 to 4 which illustrate a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems including a display (screen) 204 defining a viewing area, such as a liquid crystal display (LCD) screen, with a touch-sensitive input surface or overlay 206 connected to an electronic controller 208 that together make up a touchscreen display 210. The touch-sensitive input surface/overlay 206 may comprise a protective lens or transparent protective material. The touch-sensitive overlay 206 and the electronic controller 208 provide a touch-sensitive input device and the processor 240 interacts with the touch-sensitive overlay 206 via the electronic controller 208.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising a user interface module 226, a touch point adjustment module 228 and a virtual keyboard module 229. The user interface module 226 renders and displays the GUI of the device 201 in accordance with instructions of the operating system 223 and applications 225 (as applicable). The touch point adjustment module 228 adjusts the touch point of the touchscreen display 210. The virtual keyboard module 229 implements a virtual keyboard on the touchscreen display 210.

The modules 226, 228 and 229 may, among other things, each be implemented through stand-alone software applications, or combined together in one or more of the operating system 223 and applications 225. In some example embodiments, the functions performed by each of the above identified modules 226, 228, 229 may each be realized as a plurality of independent elements, rather than a single integrated element, and any one or more of these elements may be implemented as parts of other software applications.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display device 204) according to the application.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a navigational tool such as a clickable/depressible trackball or thumbwheel, or a vibrator for providing vibratory notifications in response to various events on the device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 227 in an erasable persistent memory, which in one example embodiment is the flash memory 244. In various embodiments, the data 227 includes service data comprising information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 222. The telephony functions are provided by a combination of software/firmware (i.e., the voice communication module) and hardware (i.e., the microphone 222, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Referring now to FIGS. 3 and 4, the construction of the device 201 will be described in more detail. The device 201 includes a rigid case 304 for housing the components of the device 201 that is configured to be held or cradleable in a user's hand while the device 201 is in use. The touchscreen display 210 is mounted within a front face 305 of the case 304 so that the case 304 frames the touchscreen display 210 and exposes it for user-interaction therewith. The case 304 has opposed top and bottom ends designated by references 322, 324 respectively, and left and right sides designated by references 326, 328 respectively which extend transverse to the top and bottom ends 322, 324. In the shown embodiments of FIG. 3A and 3B, the case 304 (and device 201) is elongate having a length defined between the top and bottom ends 322, 324 longer than a width defined between the left and right sides 326, 328. Other device dimensions are also possible.

As further illustrated in FIG. 4, the case 304 includes a back 76, a frame 78 which frames the touch-sensitive display 210, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board (not shown). The back 76 includes a plate (not shown) that is releasably attached for insertion and removal of, for example, the battery 238 and the memory module 230 described above. It will be appreciated that the back 76, the sidewalls 80 and the frame 78 can be injection molded, for example.

The display device 204 and the overlay 206 can be supported on a support tray 84 of suitable material such as magnesium for providing mechanical support to the display device 204 and overlay 206. The display device 204 and overlay 206 are biased away from the base 82, toward the frame 78 by biasing elements 86 such as gel pads between the support tray 84 and the base 82. Compliant spacers 88 which, for example, can also be in the form of gel pads are located between an upper portion of the support tray 84 and the frame 78. The touchscreen display 210 is moveable within the case 304 as the touchscreen display 210 can be moved toward the base 82, thereby compressing the biasing elements 86. The touchscreen display 210 can also be pivoted within the case 304 with one side of the touchscreen display 210 moving toward the base 82, thereby compressing the biasing elements 86 on the same side of the touchscreen display 210 that moves toward the base 82.

In the example embodiment, the switch 261 is supported on one side of the base 82 which can be a printed circuit board while the opposing side provides mechanical support and electrical connection for other components (not shown) of the device 201. The switch 261 can be located between the base 82 and the support tray 84. The switch 261, which can be a mechanical dome-type switch (or in other example embodiments a plurality of mechanical dome-type switches), for example, can be located in any suitable position such that displacement of the touchscreen display 210 resulting from a user pressing the touchscreen display 210 with sufficient force to overcome the bias and to overcome the actuation force for the switch 261, depresses and actuates the switch 261. In the present example embodiment the switch 261 is in contact with the support tray 84. Thus, depression of the touchscreen display 210 by application of a force thereto, causes actuation of the switch 261, thereby providing the user with a positive tactile quality during user interaction with the user interface of the 201. The switch 261 is not actuated in the rest position shown in FIG. 4, absent applied force by the user. It will be appreciated that the switch 261 can be actuated by pressing anywhere on the touchscreen display 210 to cause movement of the touchscreen display 210 in the form of movement parallel with the base 82 or pivoting of one side of the touchscreen display 210 toward the base 82. The switch 261 is connected to the processor 240 and can be used for further input to the processor when actuated. Although a single switch is shown any suitable number of switches can be used. In other embodiments, the switch 261 may be omitted.

The touchscreen display 210 can be any suitable touchscreen display such as a capacitive touchscreen display. A capacitive touchscreen display 210 includes the display device 204 and the touch-sensitive overlay 206, in the form of a capacitive touch-sensitive overlay 206. It will be appreciated that the capacitive touch-sensitive overlay 206 includes a number of layers in a stack and is fixed to the display device 204 via a suitable optically clear adhesive. The layers can include, for example a substrate fixed to the display device 204 (e.g. LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Figure 5:
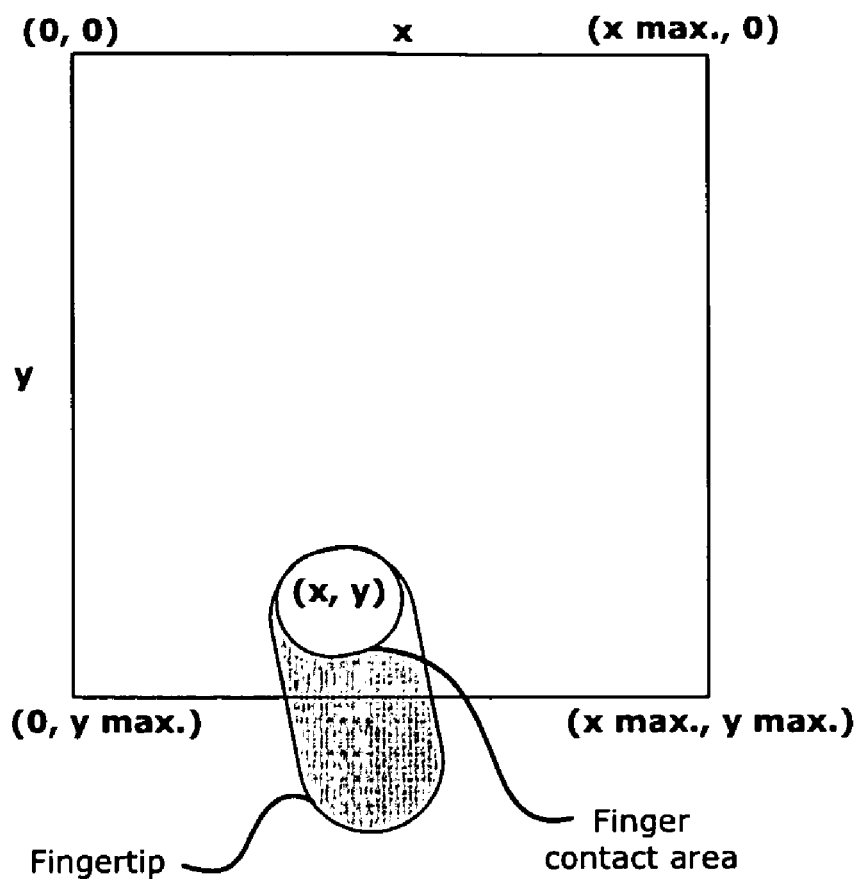
FIG. 5 illustrates a Cartesian dimensional coordinate system of a touchscreen which map locations of touch input signals in accordance with one example embodiment of the present disclosure.

Each of the touch sensor layers comprises an electrode layer each having a number of spaced apart transparent electrodes. The electrodes may be a patterned vapour-deposited ITO layer or ITO elements. The electrodes may be, for example, arranged in an array of spaced apart rows and columns. As shown in FIG. 5, the touch sensor layers/electrode layers are each associated with a coordinate (e.g., x or y) in a coordinate system used to map locations on the touchscreen display 210, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers provide a signal to the controller 208 which represent the respective x and y coordinates of the touchscreen display 210. That is, x locations are provided by a signal generated by one of the touch sensor layers and y locations are provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive overlay 206, the object draws away some of the charge of the electrodes and reduces its capacitance. The controller 208 receives signals from the touch sensor layers of the touch-sensitive overlay 206, detects touch inputs by determining changes in capacitance which exceed a predetermined threshold, and determines the centroid of a contact area defined by electrodes having a change in capacitance which exceeds the predetermined threshold, typically in x, y (Cartesian) coordinates.

The controller 208 sends the centroid of the contact area to the processor 240 of the device 201 as the location of the touch input detected by the touchscreen display 210. Depending on the touch-sensitive overlay 206 and/or configuration of the touchscreen display 210, the change in capacitance which results from the presence of a conductive object near the touch-sensitive overlay 206 but not contact the touch-sensitive overlay 206, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch input on the touchscreen display 210 can be determined. For example, the size and the shape (or profile) of the touch input on the touchscreen display 210 can be determined in addition to the location based on the signals received at the controller 208 from the touch sensor layers. For example, the touchscreen display 210 may be used to create a pixel image of the contact area created by a touch input. The pixel image is defined by the pixel elements represented by the intersection of electrodes in the touch sensor layers/electrode layers. The pixel image may be used, for example, to determine a shape or profile of the contact area.

The centroid of the contact area is calculated by the controller 208 based on raw location and magnitude (e.g., capacitance) data obtained from the contact area. The centroid is defined in Cartesian coordinates by the value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \quad (1)$$

$$Y_c = \frac{\sum_{i=1}^{n} Z_i * y_i}{\sum_{i=1}^{n} Z_i} \quad (2)$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value) at each pixel in the contact area, the index i represents the electrodes in the contact area and n represents the number of electrodes in the contact area. Other methods of calculating the centroid will be understood to persons skilled in the art.

The controller 208 of the touchscreen display 210 is typically connected using both interpret and serial interface ports to the processor 240. In this way, an interrupt signal which indicates a touch input has been detected, the centroid of the contact area, as well as raw data regarding the location and magnitude of the activated electrodes in the contact area are passed to the processor 240. However, in other example embodiments only an interrupt signal which indicates a touch input has been detected and the centroid of the contact area are passed to the processor 240. In embodiments where the raw data is passed to the processor 240, the detection of a touch input and/or the determination of the centroid of the contact area may be performed by the processor 240 of the device 201 rather than the controller 208 of the touchscreen display 210.

In other embodiments, the touchscreen display 210 may be a display device, such as an LCD screen, having the touch-sensitive input surface (overlay) 206 integrated therein. One example of such a touchscreen is described in commonly owned U.S. patent publication no. 2004/0155991, published Aug. 12, 2004 (also identified as U.S. patent application Ser. No. 10/717,877, filed Nov. 20, 2003) which is incorporated herein by reference.

While a specific embodiment of the touchscreen display 210 has been described, any suitable type of touchscreen in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

Referring again to FIG. 5, a Cartesian (two dimensional) coordinate system used to map locations of the touchscreen display 210 in accordance with one embodiment of the present disclosure will be described. The touchscreen display 210 defines a Cartesian coordinate system defined by x and y-axes in the input plane of the touchscreen display 210. Each touch input on the touchscreen display 210 returns a touch point defined in terms of an (x, y) value. The returned touch point is typically the centroid of the contact area.

In the shown embodiment, the touchscreen display 210 has a rectangular touch-sensitive overlay 206; however, in other embodiments, the touch-sensitive overlay 206 could have a different shape such as a square shape. The rectangular touch-sensitive overlay 206 results in a screen which is divided into a rectangular of pixels with positional values ranging from 0 to the maximum in each of the x and y-axes (x max. and y max. respectively). The x-axis extends in the same direction as the width of the device 201 and the touch-sensitive overlay 206. The y-axis extends in the same direction as the length of the device 201 and the touch-sensitive overlay 206. In the shown embodiment, the touchscreen 210 has a square shaped touch-sensitive input surface 108 and an 8-bit resolution which results in a screen which is divided into a 256×256 pixel square with positional values ranging from 0 to 255 in each of the x and y-axes. However, it will be appreciated that in other embodiments a resolution greater than or less than 8-bits could be used.

The coordinate system has an origin (0, 0) which is located at the top left-hand side of the touchscreen display 210. For purposes of convenience, the origin (0, 0) of the Cartesian coordinate system is located at this position in all of the embodiments described in the present disclosure. However, it will be appreciated that in other embodiments the origin (0, 0) could be located elsewhere such as at the bottom left-hand side of the touchscreen display 210, the top right-hand side of the touchscreen display 210, or the bottom right-hand side of the touchscreen display 210. The location of the origin (0, 0) could be configurable in other embodiments.

During operation, a graphical user interface (GUI) for controlling the operation of the device 201 is displaying on the touchscreen display 210. The GUI is rendered prior to display by the operating system 223 or an application 225 which causes the processor 240 to display content on the touchscreen display 210. The GUI of the device 201 has a screen orientation in which the text and user interface elements of the GUI are oriented for normal viewing. It will be appreciated that the screen orientation for normal viewing independent of the language supported, that is the screen orientation for normal viewing is the same regardless of whether a row-oriented language or column-oriented language (such as Asian languages) is displayed within the GUI. Direction references in relation to the GUI, such as top, bottom, left, and right, are relative to the current screen orientation of the GUI rather than the device 201 or its case 304.

In embodiments in which the display screen is rectangular in shape, such as that shown in FIG. 5, the screen orientation is either portrait (vertical) or landscape (horizontal). A portrait screen orientation is a screen orientation in which the text and other user interface elements extend in a direction transverse (typically perpendicular) to the length (y-axis) of the display screen. A landscape screen orientation is a screen orientation in which the text and other user interface elements extend in a direction transverse (typically perpendicular) to the width (x-axis) of the display screen. In some embodiments, the GUI of the device 201 may change its screen orientation between a portrait screen orientation and landscape screen orientation in accordance with changes in device orientation, depending on the settings and/or operational mode of the device 201. In other embodiments, the screen orientation of the device 201 may be fixed. In yet other embodiments in which the display screen is relatively square in shape, the screen orientation changes based on device orientation so that is oriented for normal viewing the user, however, the aspect ratio does not change since the dimensions of the screen are substantially symmetrical.

The mobile communication device 201 also comprises a device orientation subsystem 249 comprising at least one sensor which is connected to the processor 240 and which is controlled by one or a combination of a monitoring circuit and operating software. The sensor detects the orientation of the device 201 or information from which the orientation of the device 201 can be determined, such as acceleration. In some embodiments, the sensor is a three-axis accelerometer. In other embodiments, an orientation sensor other than an accelerometer could be used such as a gravity sensor, a gyroscope, a tilt sensor, an electronic compass or other suitable sensor, or combinations thereof. In some embodiments, the device orientation subsystem 249 may comprise two or more sensors such as an accelerometer and an electronic compass.

As will be appreciated by persons skilled in the art, an accelerometer is a sensor which converts acceleration from motion (e.g. movement of the mobile communication device 201 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

Figure 6:
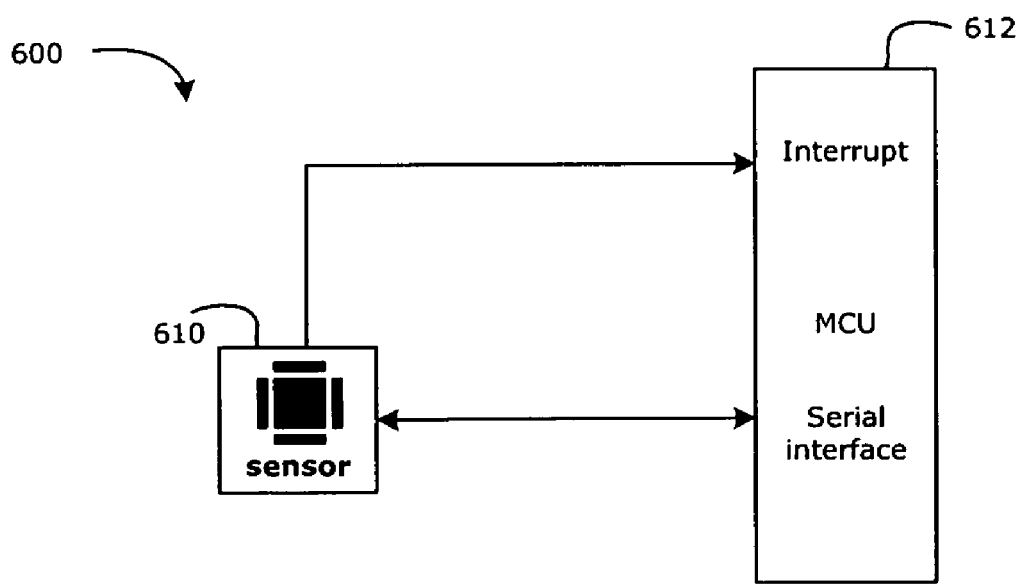
FIG. 6 is a block diagram of a device orientation detection subsystem comprising a digital 3-axis accelerometer in accordance with one example embodiment of the present disclosure.

Referring briefly to FIG. 6, a device orientation subsystem 249 in accordance with one example embodiment of the present disclosure will be described. The circuit 600 comprises a digital 3-axis accelerometer 610 connected to the interrupt and serial interface of a controller (MCU) 612. The controller 612 could be the processor 240 of the device 201. The operation of the controller 612 is controlled by software, which may be stored in internal memory of the controller 612. The operational settings of the accelerometer 610 are controlled by the controller 612 using control signals sent from the controller 612 to the accelerometer 610 via the serial interface. The controller 612 may determine the device orientation in accordance with the acceleration measured by the accelerometer 610, or raw acceleration data measured by the accelerometer 610 may be sent to the processor 240 of the device 201 via its serial interface where device orientation is determined by the operating system 223, or other software module 220. In other embodiments, a different digital accelerometer configuration could be used, or a suitable analog accelerometer and control circuit could be used.

Figure 8C:
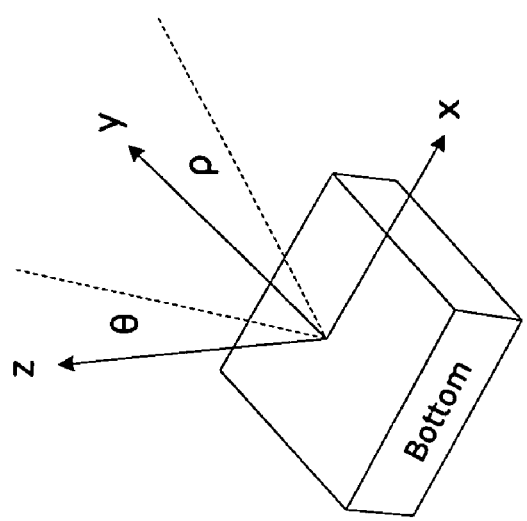
FIG. 8A to 8C are schematic diagrams illustrating the assignment of pitch and roll vectors of a three-axis sensor in accordance with one embodiment of the present disclosure.
Figure 8B:
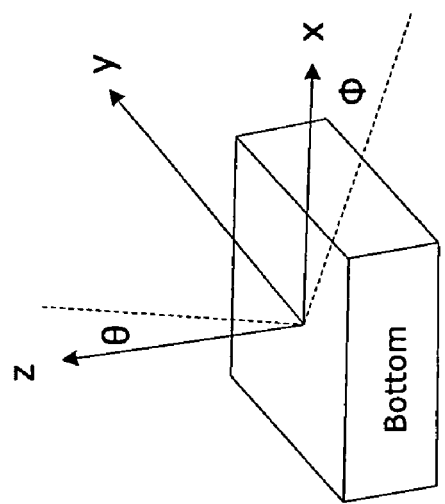
Figure 8A:
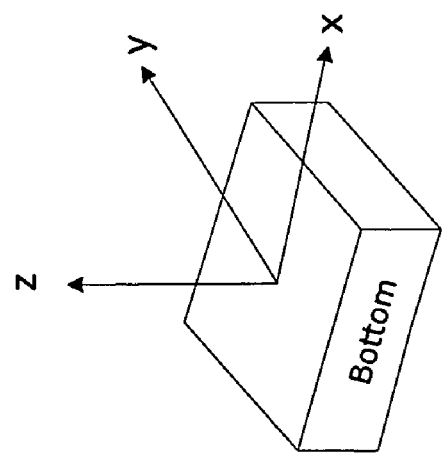

Referring now to FIG. 8A to 8C, the assignment of pitch and roll vectors of a three-axis accelerometer in accordance with one example embodiment of the present disclosure will be briefly described. Each measurement axis is aligned with an axis of the mobile communication device 201. The x-axis and y-axis are typically aligned with the input plane of the touchscreen display 210. The z-axis is perpendicular to the horizontal plane and detects when the mobile communication device 201 is moved vertically.

As shown in FIG. 8B, pitch ($\phi$) is the angle of the x-axis relative to the ground. $\theta$ is the angle of the z-axis relative to gravity. As shown in FIG. 8C, roll ($\rho$) is the angle of the y-axis relative to the ground. It will be appreciated that rotation may occur about any combination of sensing axes. The concepts and methodology described herein can be applied to any axis orientation and any combination of pitch ($\phi$) angle, roll ($\rho$) angle and $\theta$ (the angle of the z-axis relative to gravity). Pitch ($\phi$), roll ($\rho$) and the angle of the z-axis relative to gravity ($\theta$) of a three-axis accelerometer may be calculated using equations (3), (4) and (5):

$$\varphi = \arctan \frac{x_{sensor}}{\sqrt{y_{sensor}^2 + z_{sensor}^2}} \quad (3)$$

$$\rho = \arctan \frac{y_{sensor}}{\sqrt{x_{sensor}^2 + z_{sensor}^2}} \quad (4)$$

$$\theta = \arctan \frac{\sqrt{x_{sensor}^2 + y_{sensor}^2}}{z_{sensor}} \quad (5)$$

where $x_{sensor}$, $y_{sensor}$ and $z_{sensor}$ are the measurements from the x, y and z-axes of the three-axis accelerometer. It will be appreciated that pitch ($\phi$), roll ($\rho$) and the angle of the z-axis relative to gravity ($\theta$) can also be determined by other means.

Figure 9A:
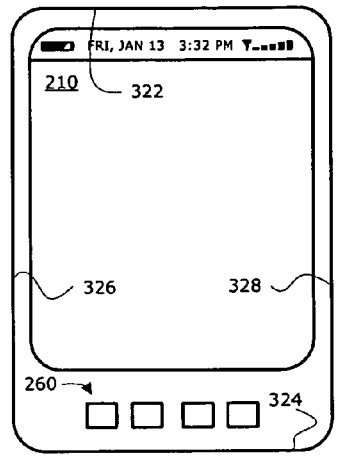
FIG. 9 to 9F illustrated six (6) device orientations recognized by an device orientation subsystem of the handheld electronic device in accordance with one example embodiment of the present disclosure.
Figure 9B:
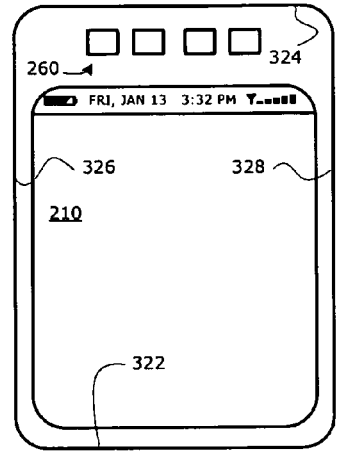
Figure 9C:
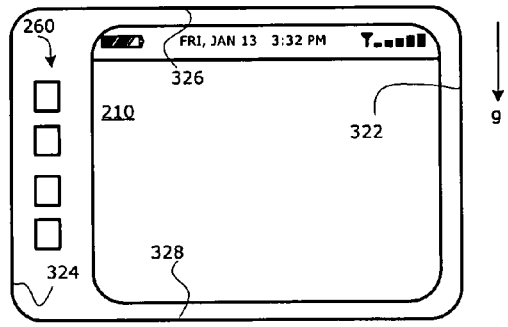
Figure 9D:
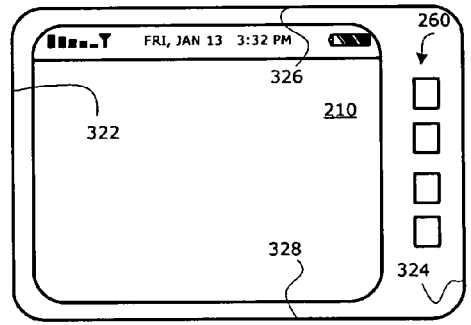
Figure 9E:
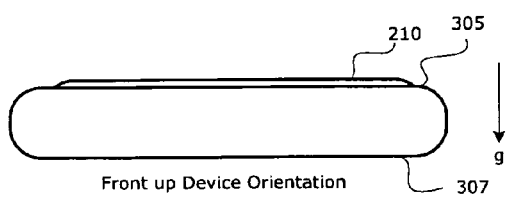
Figure 9F:
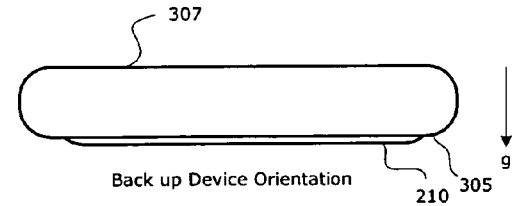

In some embodiments, the device 201 includes a user interface module 226 (shown in FIG. 2) which uses input from the device orientation subsystem 249 to select and update the screen orientation of the GUI presented within the touchscreen display 210 in accordance with the device orientation, amongst other inputs. Referring now to FIG. 9A to 9F, predefined device orientations used by the user interface module 226 in some embodiments of the present disclosure will be described. The device orientation subsystem 249 or processor 240, depending on the embodiment, uses measurements of the device orientation subsystem 249 (e.g., the accelerometer) to determine the device orientation to be one of six possible device orientations comprising: (1) a "top up" device orientation (as shown in FIG. 9A); (2) a "bottom up" device orientation (as shown in FIG. 9B); (3) a "left up" device orientation (as shown in FIG. 9C); (4) a "right up" device orientation (as shown in FIG. 9D); (5) a "front up" (or "face up") device orientation (as shown in FIG. 9E); and (6) a "back up" device orientation (as shown in FIG. 9F). Other device orientations are possible and could be used in other embodiments.

It will be appreciated that the predefined device orientations are defined by which one of the top 322, bottom 324, left-hand side 326, right-hand side 328, front face 305, and back face 307 of the device 201 is directed generally upwards. Moreover, it will be appreciated that the device 201 need not be orientated precisely in one the illustrated device orientations for the determination of the device orientation. Instead, the predefined device orientations act as reference positions. The device orientation is determined by selecting the reference position (e.g., which of the six predefined device orientations shown in FIG. 9A to 9F) is closest to the actual device orientation. Each of the predefined device orientations may be mapped to orientation values measured by the orientation sensor or derived from its measurements in order to determine the reference position which is closest to the actual device orientation. The orientation values may be used to construct an orientation profile of each of the six predefined device orientations. The orientation values which are mapped to the predefined device orientations, in some embodiments, may be defined, directly or indirectly, in terms of pitch ($\phi$), roll ($\rho$) and the angle of the z-axis relative to gravity ($\theta$) measured by a three-axis accelerometer, which may calculated using equations (3), (4) and (5) described above.

In some embodiments in which the touchscreen display 210 is rectangular in shape, the processor 240, in some operational modes, may change the screen orientation of the GUI to a landscape screen orientation when the mobile communication device 201 is (re)positioned in a generally horizontal direction in accordance with the instructions of the user interface module 226, and may change the screen orientation of the GUI to a portrait screen orientation when the mobile communication device 201 is (re)positioned in a generally vertical direction in accordance with the instructions of the user interface module 226. The processor 240 may invert or "flip" the screen orientation of the GUI horizontally or vertically if the mobile communication device 201 is flipped horizontally or vertically. In other operational modes of the processor 240 or in other embodiments, the screen orientation may be fixed.

Referring again to the FIG. 9A to 9F, in some embodiments the screen orientation of the GUI is selected in accordance with mappings of screen orientation to device orientation as set forth below in Table 1 (subject to application overrides as described below):

TABLE 1

Device Orientation vs. Screen Orientation

| Device Orientation | Screen Orientation |
| --- | --- |
| "top up" device orientation (FIG. 9A) | portrait (up) screen orientation |
| "bottom up" device orientation (FIG. 9B) | portrait (down) screen orientation |
| "left up" device orientation (FIG. 9C) | landscape (left) screen orientation |
| "right up" device orientation (FIG. 9D) | landscape (right) screen orientation |
| "front up" device orientation (FIG. 9E) | default/previous screen orientation |
| "back up" device orientation (FIG. 9F) | default/previous screen orientation (or display screen disabled/off) |

Having regard to the above-described screen orientations (also referred to as aspect ratios), it will be appreciated that the screen orientation is portrait in both the "top up" and "bottom up" device orientations shown in FIG. 9A and FIG. 9B, respectively, and that the screen orientation is landscape in both the "left up" and "right up" device orientations shown in FIG. 9C and FIG. 9D, respectively. To differentiate between the variants of the portrait screen orientation in the "top up" and "bottom up" device orientations and landscape screen orientation in the "left up" and "right up" device orientations, a direction of the screen orientation is defined. The direction is relative to a fixed position on the device 201, which is the top 322 of the device 201 in the present embodiment. A different directional reference could be used in other embodiments. Thus, the screen orientation in the "top up" device orientation (FIG. 9A) is the portrait (up) screen orientation because the top 322 of the device 201 is directed upwards relative to the ground and force of gravity. The screen orientation in the "bottom up" device orientation (FIG. 9B) is the portrait (down) screen orientation because the top 322 of the device 201 is directed downwards relative to the ground and force of gravity. Otherwise stated, in the "bottom up" device orientation of FIG. 9B, the bottom 324 of the device 201 is directed upwards relative to the ground and force of gravity.

The screen orientation in the "left up" device orientation (FIG. 9C) is landscape (left) screen orientation because the top 322 of the device 201 is rotated in the vertical plane towards the left side 326 of the device 201. The screen orientation in the "right up" device orientation (FIG. 9D) is landscape (right) screen orientation because the top 322 of the device 201 is rotated in the vertical plane towards the right side 328 of the device 201.

In some embodiments, the "front up" (FIG. 9E) and "back up" (FIG. 9F) device orientations are not associated with a particular screen orientation, except for a default screen orientation. The default screen orientation is typically the portrait (up) orientation of the "top up" device orientation as this is typically considered the "normal" operating position of the device 201. In the "front up" and "back up" device orientations, the screen orientation is the previous screen orientation of the device 201 when it was last in the "top up", "bottom up", "left up" or "right up" device orientation. The previous screen orientation of the device 201 is stored in memory 244 by the user interface module 226.

As described in more detail below, some of the applications 225 may have a screen orientation of the GUI which varies in accordance with the orientation of the device 201; however, one or more of the applications 225, such as the phone application, may a fixed screen orientation which is unaffected by the device orientation.

Referring again to FIG. 3, the control buttons or keys 260, represented individually by references 262, 264, 266, 268, which are located below the touchscreen display 210 on the front face 305 of the device 201 which generate corresponding input signals when activated. The control keys 260 may be construction using any suitable key construction, for example, the controls keys 260 may each comprise a dome-switch. In other embodiments, the control keys 260 may be located elsewhere such as on a side of the device 201. If no control keys are provided, the function of the control keys 262-268 described below may be provided by one or more virtual keys (not shown), which may be part of a virtual toolbar or virtual keyboard.

In some embodiments, the input signals generated by activating (e.g. depressing) the control keys 262 are context-sensitive depending on the current/active operational mode of the device 201 or current/active application 225. The key 262 may be a send/answer key which can be used to answer an incoming voice call, bring up a phone application when there is no incoming voice call, and start a phone call from the phone application when a phone number is selected within that application. The key 264 may be a menu key which invokes context-sensitive menus comprising a list of context-sensitive options. The key 266 may be an escape/back key which cancels the current action, reverses (e.g., "back up" or "go back") through previous user interface screens or menus displayed on the touchscreen display 210, or exits the current application 225. The key 268 may be an end/hang up key which ends the current voice call or hides the current application 225.

Although in the illustrated embodiments the case 304 is shown as a single unit it could, among other possible configurations, include two or more case members hinged together (such as a flip-phone configuration or a clam shell-style lap top computer, for example), or could be a "slider phone" in which the keyboard is located in a first body which is slideably connected to a second body which houses the display screen, the device being configured so that the first body which houses the keyboard can be slide out from the second body for use. In other embodiments, the mobile communication device 201 could have a mechanical keyboard in addition to the touchscreen display 210.

Figure 11A:
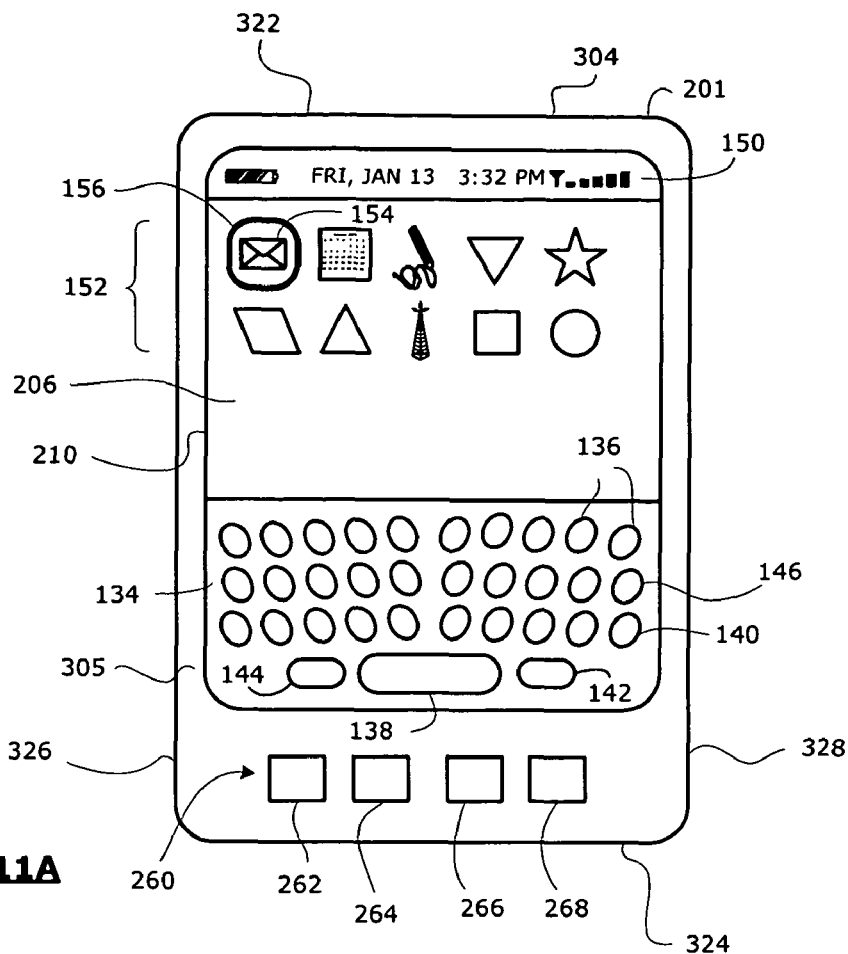
FIG. 11A illustrates a portrait screen orientation of a virtual keyboard in accordance with one embodiment of the present disclosure.

FIG. 11A illustrates a portrait screen orientation of a virtual keyboard 134 implemented by a virtual keyboard module 229 in an input mode of the device 201. The virtual keyboard 134 comprises a plurality of virtual keys or buttons, identified individually by reference numerals 136, 138, 140, 142, 144, 146 for user input of displayable characters (alphanumeric characters or symbols such as pound and asterisk) and/or causing the processor 240 to perform an action such as an executable function or command by touching the region or portion of the touchscreen 210 in which the virtual keys are displayed.

In the portrait screen orientation, the virtual keyboard 134 is displayed between the left and right sides 126, 128 of the device 201 in the lower portion of the touch-sensitive input surface 208 towards the bottom 124 of the device 201. A virtual keyboard 134 in a portrait screen orientation scrolls horizontally across the face 105 of the device 201 in the same general direction as its width. In other embodiments, the virtual keyboard 134 may be located elsewhere (e.g. towards the top of touch-sensitive input surface 208) and may occupy a larger or smaller portion of the touchscreen 210 than that shown in FIG. 11A. In some embodiments, the virtual keyboard 134 in the in the portrait screen orientation may occupy a majority of the touch-sensitive input surface 208 of touchscreen 210.

Figure 11B:
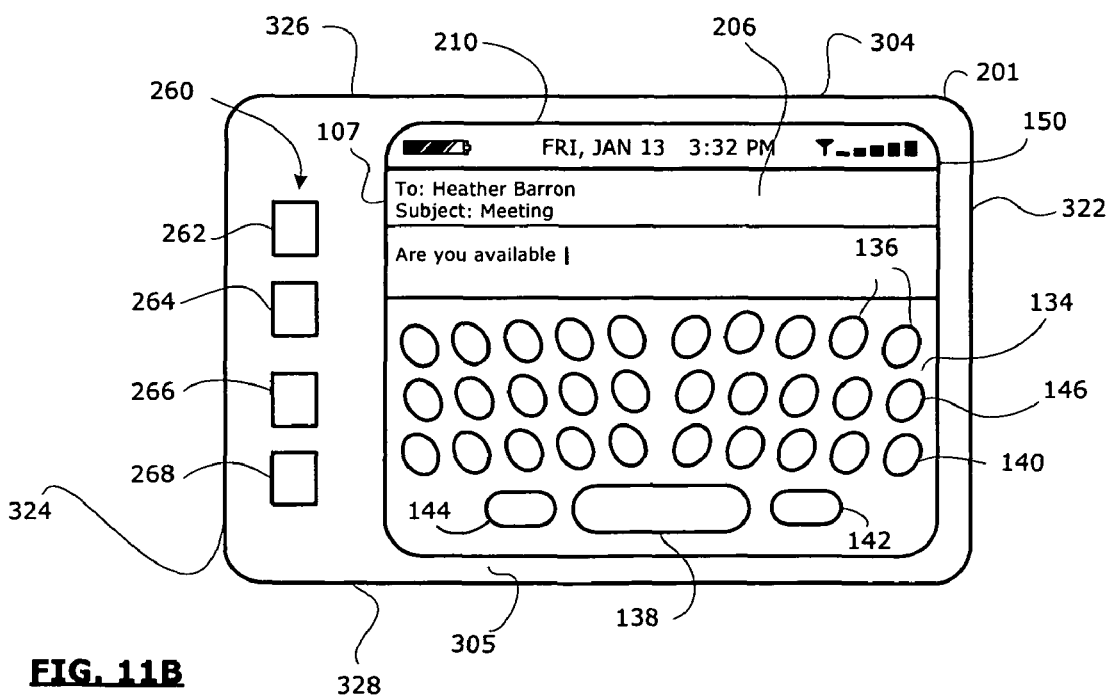
FIG. 11B illustrates a landscape screen orientation of a virtual keyboard in accordance with one example embodiment of the present disclosure.

FIG. 11B illustrates a landscape screen orientation of the virtual keyboard 134 in which the virtual keyboard 134 is displayed between the top and bottom 122, 124 of the device 201. A virtual keyboard 134 in the landscape screen orientation scrolls horizontally across the face 105 of the device 201 in the same general direction as its length. In other embodiments, the virtual keyboard 134 may be located elsewhere on the touchscreen 210 and may occupy a larger or smaller portion of the touchscreen 210 than that shown in FIG. 11B. In some embodiments, the virtual keyboard 134 in the landscape screen orientation may occupy a majority of the touchscreen 210.

In both the portrait screen orientation and landscape screen orientation in the shown embodiments, the virtual keyboard 134 is located in a lower portion of the GUI relative to the screen orientation (and typically the current device orientation) so that it may be more easily touched (or actuated) using the thumbs or other fingers of the user while the user is holding the device 201. In some embodiments, the device components may be configured and dimensioned so that user may hold the device 201 in such a manner to enable two-thumb typing on the virtual keyboard 134 of the device 201 (typically using both hands). In other embodiments, the device components may be configured and dimensioned so that the device 201 can be cradled in the palm of a user's hand and the virtual keyboard 134 may be touch with the thumb of the hand of the user in which the device 201 is being held. A user may use a stylus instead of fingers (e.g., thumbs) if desired. It will be appreciated that, if a capacitive touchscreen is used, fingers or a conductive device (such as a stylus having a conductive tip) should be used to register a touch input.

In the example embodiments illustrated in FIGS. 11A and 11B, the virtual keyboard 134 comprises a plurality of substantially similarly sized alphanumeric keys or buttons 136 and a larger elongated space bar key or button 138. The alphanumeric keys 136 are arranged in a plurality of rows across the touchscreen 210 with the elongate space bar key 138 located centrally below the last row of alphanumeric keys 136. In an example embodiment, at least one of the virtual keys 136 has one or more displayable character associated therewith. The virtual keyboard 134 also comprises non-alphanumeric command and/or control buttons or keys, such as a line feed or "ENTER" key 140, a "CAP" key 142 for capitalizing letters, an "ALT" key 144 for selecting an alternative input or command, and a "BACKSPACE" key 146 which backs up the cursor when the device is in a text input mode and removes the previous character input. Additional virtual control keys such as "SHIFF" and "CTRL" keys may be provided in other embodiments. Alternatively, one or more mechanical control keys may be provided to invoke the secondary or alternate input of the virtual keys 136. The mechanical control keys could be the "SHIFT" and/or "CTRL" keys, or possibly an "ALT" key replaying that in the virtual keyboard 134 of the illustrated embodiment. The control buttons or keys can be pressed (pressed once or continually pressed down, depending on the key and device configuration) to provide an alternative input of the keys 136 or other input component when pressed. As will be appreciated by those skilled in the art, keys that give alternative meaning to other input components enable expanded input capability.

The virtual keyboard 134 may also comprise one or more specialized keys (not shown) such as a menu key which invokes context-sensitive menus comprising a list of context-sensitive options, a back key which cancels action or reverses ("backs up") through previous user interface screens or menus displayed on the touchscreen 210, a hang up key to end a voice call, and/or an answer key to answer an incoming voice call.

In the above described embodiments, the virtual keyboard 134 comprises a full keyboard comprising a plurality of keys 136 each having an alphabetic letter associated with the key on one letter per key basis. This one-to-one pairing between letters and keys will be understood to persons of ordinary skill in the art and will not be described in detail herein. In order to facilitate user input, the alphabetic letters are typically configured in a familiar QWERTY, QWERTZ, AZERTY, or Dvorak layout known in the art. In other embodiments, a reduced keyboard comprising a plurality of keys 136 each having an alphabetic letter associated with the key on multiple letter per key basis.

While example keyboard layouts and configurations have been described, it will be appreciated by persons skilled in the art that alternative full or reduced keyboard layouts and configurations may be used in other embodiments of device 201.

In the device screen of FIG. 11A, the GUI also provides within the touchscreen 210 a status bar 150 and icon selection menu 152. The status bar 150 displays information such as the current date and time, icon-based notifications, device status and/or device state. The icon selection menu 152 displays a plurality of pictorial icon menu items (icons) 154. The icon menu selection 152 provides the device user with choices of applications or functions that may be run on the mobile communication device 201. The icon menu items 154 are each selectable to link to, or launch, an associated application or function, or open an associated folder. The icon menu items 154 may, for example, be used to select an email manager application, a calendar application, a note pad application, or other application. The user can select an application to be launched by highlighting or focusing the icon menu item 154 associated with the respective application through movement of an on-screen position indicator 156 commonly referred to as a caret or cursor. The—on-screen position indicator 156 may be moved through the icon menu items 154 using a navigational inputs via the touchscreen 210 or a supplemental navigation tool such as a clickable/depressible scroll wheel or trackball (for example, by rotating a scroll wheel or trackball). When an icon menu item 154 is highlighted or focused by the on-screen indicator 156, the focused item 154 may be activated or "selected" via corresponding selecting input via the touchscreen 210 (such as clicking the touchscreen 210 and depressing the switch 261) or clicking/depressing the navigation tool. If the icon menu item 154 represents an application, activating the menu icon item 154 causes the processor 240 to launch the application logically associated with the icon 154, for example, the email manager application. As will be appreciated by persons skilled in the art, the activation input is translated by the GUI into a request to launch or invoke the application or function, or open the folder associated with the icon 154.

In the device screen of FIG. 11B, a text entry mode user interface frame or window 107 is displayed above the virtual keyboard 134. The text entry mode user interface window 107 comprises a number of navigable and editable input fields and is used in a text input or entry mode. Several device applications 225 typically have an associated text entry mode such as, for example, email messaging applications, instant messaging applications, task list applications, calendar applications and notepad applications. In the shown embodiment, the window 107 is a message composition window associated with an email messaging application. The message composition window 107 comprises a header portion 174 including an address field (e.g., "To" field) and a subject field, and a body portion 176. The text entry mode user interface of the window 107 includes a cursor or on-screen position indicator 156 which provides visual feedback as to the current input location (e.g., current field and possibly current location in the respective field depending on the current field).

Touch Point Adjustment

Referring now to FIG. 11, the operation of the touch point adjustment module 228 in accordance with one embodiment of the present disclosure will be described. The touch point adjustment module 228 is a software module which implements a touch offset to adjust the location of a touch input (referred to as a touch point) detected by the touchscreen 210 by a predetermined value. To compensate for the changing orientation of the device 201, the position detection system 249 is used to determine the current orientation of the device 201 in response to the detection of a touch input on touchscreen 210. The value of the touch offset is then dynamically selected based on the current orientation of the device 201.

When the device 201 is powered on or unlocked from a locked stated in which restrictions are placed on the device 201, the device 201 determines a touch offset based on its device orientation as described above. If the device is in the "front up" (or "face up") device orientation shown in FIG. 9E or the "back up" (or "face down") device orientation shown in FIG. 9F, a previous touch offset stored in memory 244 or a default touch offset (which is typically the touch offset for the "top up" device orientation as this is the "normal" operating position of the device 201).

When the device 201 is moved into a different one of the reference positions, a new touch offset is selected in accordance with the device orientation of the new reference position. The touch point adjustment module 228 configures the processor 240 of the device 201 to select a touch offset based on the detected orientation of the device 201, and adjust the touch point in accordance with selected touch offset. In some embodiments, the selection of the touch offset is based on the rules defined in Table 2 below.

TABLE 2

Touch Offset Value vs. Device Orientation

| Reference position/<br>device orientation | First<br>(Top Up) | Second<br>(Bottom Up) | Third<br>(Left Up) | Fourth<br>(Right Up) |
|---|---|---|---|---|
| Touch offset | (0, y1) | (0, −y2) | (x1, 0) | (−x2, 0) |

In some embodiments, the offsets x1, x2, y1 and y2 in Table 1 are predetermined values stored in memory 244. The values of the offsets x1, x2, y1 and y2 are typically the same but may be different. Typical user bias (the tendency to press below or above the target item or area) has been determined to be approximately 2 to 3 mm so the value of the touch offsets x1, x2, y2 and y2 is typically 2 to 3 mm; however it is contemplated that offset values greater than or less than 2 to 3 mm could be used. The rules defined in Table 1 have the advantage that the touch point will always be offset in the proper direction by the same amount to correct for user bias regardless of the device orientation.

It is also contemplated that the direction of the touch offset could be switched in some embodiments. Accordingly the touch offset in some embodiments could be (0, −y1), (−x1, 0), (0, y2), and (x2, 0) in the first, second, third and fourth reference positions, respectively. Although device users typically press below the target item, there may be some device users having a user bias which causes them to press above the target item or area. The ability to switch the direction of the touch offset may be advantageous in instances where the device user consistently presses above the target item regardless of the device orientation.

It is also conceivable that user bias may be different in both quantity (i.e. where the amount by which the device user presses below or above the target item) and direction depending on device orientation. Accordingly, the values of the touch offsets x1, x2, y1 and y2 values may be different in some embodiments. In addition, the direction of the touch offset may be different than the two alternatives provided above. The use of variable touch offset values and directions may be advantageous for device users having an inconsistent user bias.

Because user bias may vary between device users, the touch offset rules and settings may be configurable by the device user. User settings for the touch offset value and/or direction in the reference positions may be provided in some embodiments. In addition to or instead of user settings, in some embodiments a calibration mode may be provided by the device 201 which determines the required direction and value of the touch offset in the various reference positions for a particular device user in accordance with determined user bias. Calibration may be performed using a teaching mode of device 201 in which the user actively calibrates the touch offset in accordance with the user's input style and patterns, or a passive machine learning mode which monitors the device user's touch inputs in the background over a predetermined period of time during normal use of the device 201. This functionality is provided by a calibration module (not shown) stored in the memory of the device 201.

As noted above, the device 201 will rarely be orientated precisely at one of the six predetermined device orientations. To account for the multitude of possible device orientations, the predetermined device orientations closest to actual device orientation is used to determine the device orientation. Next, the device orientation is compared to the four reference positions to determine if the device 201 is in one of the four reference position. If the device 201 is in one of the four reference position, the touch offset may be selected in accordance with the reference position/device orientation. If the device 201 is not in one of the reference position, it is in either the "front up" or "back up" device orientations and a suitable touch offset cannot be determined. Accordingly, a previous touch offset or default touch offset is used. The touch point is then adjusted in accordance with selected touch offset.

The association between the reference positions and the predetermined device orientations, and the association between predetermined device orientations and plurality of possible device orientations may be stored in memory 244 as a table or mathematical formulae which describe the relationship between reference positions and the predetermined device orientations, and the association between predetermined device orientations and plurality of possible device orientations.

In other embodiments, rather than determining the device orientation in response to detection of a touch input, the device orientation may be determined continuously or a regular intervals, for example, for use in other device applications such as, for example, dynamic changing the screen orientation. In such cases, the device orientation may be fetched from the memory 244 shared with the other device applications. In some embodiments, the touch offset may be determined with the device orientation and stored in memory of the device 201, rather than being determined in response to detection of a touch input.

In other embodiments, an orientation log of the orientation/positional data received from the positional signals received by the position detection subsystem 249 may be maintained by the device 201, for example, by the touch point adjustment module 228 or user interface module 226. The orientation log stores device orientation data over a predetermined period of time, such as 1 to 5 seconds, for example. To prevent spurious changes in device orientation, the device 201 may need to be held relatively stable/constant within the range of device orientations associated with one of the six predefined device orientations for a change in device orientations to be recognized by the device 201. In some embodiments, the processor 240 may be configured to recognize patterns in a recent history of the orientation log such as, for example a 1 or 2 second duration or less, and to identify patterns in the recent log history which correspond to a change in the device orientation. Recognition of patterns in the log may be performed according to artificial intelligence techniques, fuzzy logic or other approaches known in the art.

Figure 10:
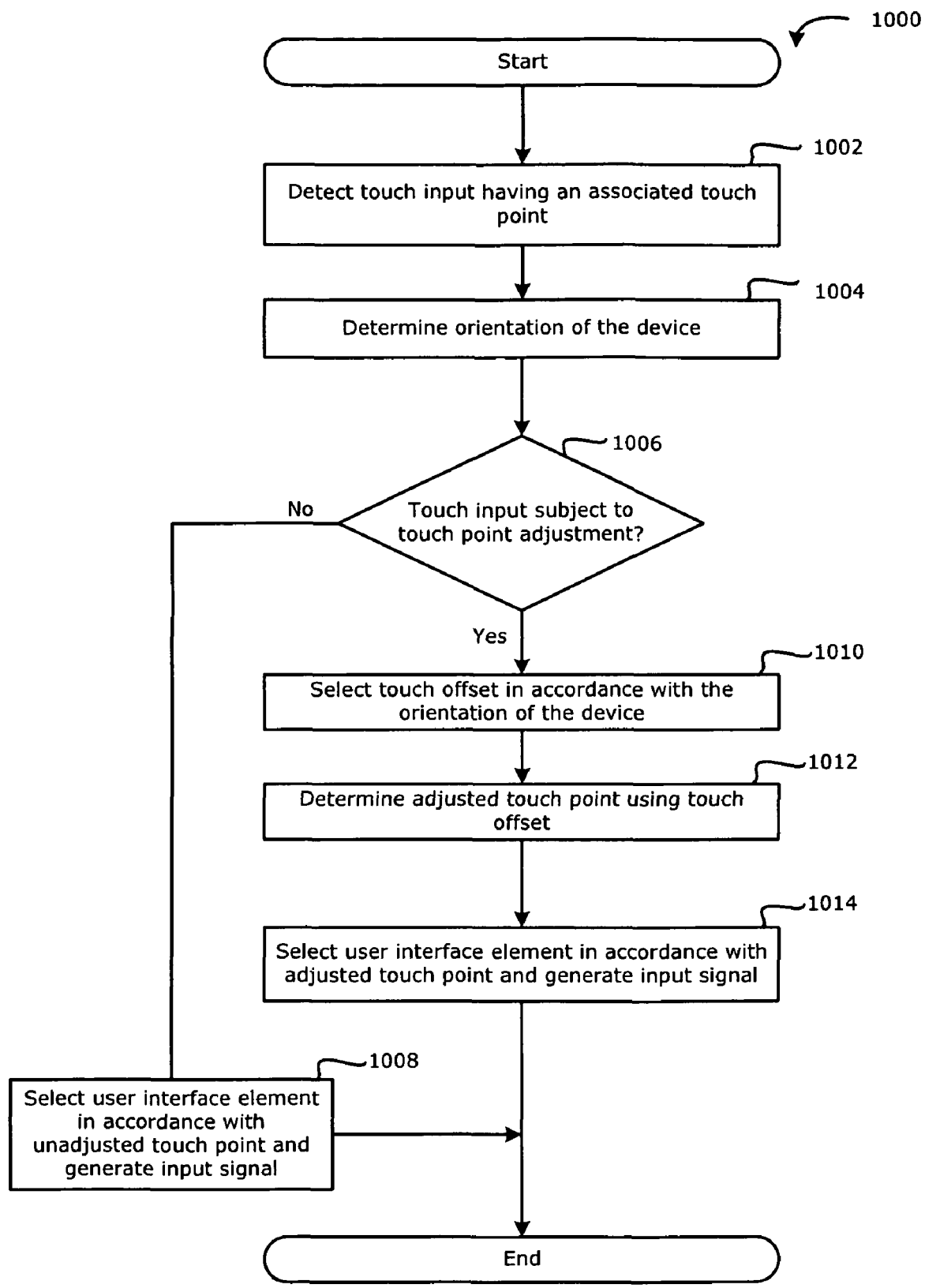
FIG. 10 is a flowchart illustrating example operations for touch point adjustment of an input of a touchscreen of a handheld electronic device using the orientation of the handheld electronic device in accordance with one example embodiment of the present disclosure.

Reference is now made to FIG. 10 which illustrates example operations 1000 for touch point adjustment in accordance with one embodiment of the present disclosure. The operations 1000 are used in combination with a graphical user interface (GUI) implemented by the user interface module 226. The GUI comprises a plurality of selectable user interface elements each having a portion of the viewing area of the touchscreen 210 associated herewith, and each generating a respective input signal in response to selection thereof. The user interface elements may be virtual keys or buttons of a virtual keyboard 134 or icons 154 of an icon selection menu 152, for example.

The operations 1000 are carried out by the processor 240 of the device 201 under the instruction of the touch point adjustment module 228. The touch point adjustment module 228 may be part of the operating system 223 and/or user interface module 226. To improve processing efficiency, the touch point adjustment module 228 is typically not part of an application 225, however, the active application 225 (also referred to as the foreground application 225) may affect whether a (dynamic) touch offset is used The touch point adjustment module 228 configures the processor 240 to monitor for and detect the occurrence of a touch input, to monitor for and detect the occurrence positional signals (or motion signals) from the position detection subsystem 249, and to use this information to dynamically select a touch offset and adjust the touch point detected by the touchscreen 210 in accordance with the selected touch offset.

In the first step 1002, the processor 240 monitors for and detects touch inputs on the touchscreen 210 This may involve monitoring for and detecting touch input signals received from the touchscreen 210. Touch input signals are generated by the touchscreen 210 in response to the touchscreen 210 detecting a touch input such as a touch or press.

It will be appreciated that the displayed GUI may comprise one or more "dead spots" which are not associated with any selectable user interface element. To accommodate dead spots, in some embodiments the user interface module 226 may filter out touch inputs which do not correspond to a selectable user interface element and do not return such inputs to the operating system 223 or active application 225. This prevents a touch input from being recognized by the operating system 223 and/or active application 225, and therefore the touch point adjustment operations described herein are not performed on such inputs.

Touch input signals are transmitted from the touchscreen 210 to the processor 240 of the device 201. The touch input signals comprise information which specifies the location of the touch input (i.e., the touch point) on the touchscreen 210. The touch input signals may comprise an interrupt signal on an interrupt port connecting the touchscreen 210 and the processor 240 which notifies the processor 240 that a touch input has been detected, and a data signal from a data port connecting the touchscreen 210 and the processor 240, such as a serial data port, which provides the processor 240 with at least location information concerning the touch input. The location information may be the touch point, for example, the centroid of the contact area, or raw data defining which define the contact area which is provided by the controller of the touchscreen 210. Alternatively, in other embodiments the processor 240 may determine the touch point from touch input signals comprises raw data passed from the controller of the touchscreen 210 to the processor 240, for example, as the centroid of the contact area defined by the raw data.

Next, in step 1004 the processor 240 determines the device orientation from positional signals (or motion signals) received from the position detection subsystem 249, for example, using the tilt equations previously described. The determined device orientation may be stored in memory 244. The positional signals are generated by the sensor of the position detection subsystem 249. In at least some embodiments, the sensor is a three-axis accelerometer. The processor 240 may determine the device orientation in response to detection of the touch input, for example upon receiving an interrupt signal from the touchscreen 210. Alternatively, in other embodiments the processor 240 may determine the device orientation continuously or at regular intervals. The device orientation may be determined, for example, for other purposes such as determining the screen orientation for the GUI. In such cases, the processor 240 monitors for and detects positional signals received from the position detection subsystem 249 either continuously or at regular intervals. In yet other embodiments, the positional signal may comprise information which specifies the device orientation of the device 201, for example, if the sensor of the position detection subsystem 249 is a tilt sensor, gyroscope, or other positional sensor. In at some embodiments, the device orientation is determined to be in one of the predetermined six (6) device orientations described above.

Next, in step 1006 the processor 240 determines whether the touch point is subject to touch point adjustment. This step is optional. In other embodiments, a touch offset may be determined for all touch inputs. In some embodiments, step 1006 comprises determining the active application 225, operational mode of the device 201 (e.g., active telephone call) or the current user interface screen of the GUI which is displayed on the touchscreen 210. The active application 225, operational mode of the device 201, or the current user interface screen of the GUI is then compared to one or more predefined rules which define when touch point adjustment is to be performed. In other embodiments, the determination as to whether touch point adjustment is to be performed is made when the active application 225 is launched, the operational mode of the device 201 is started, or the current user interface screen of the GUI is displayed. The operations 1000 are then disabled or enabled accordingly.

If the criteria used to determine whether touch point adjustment is to be performed is the user interface screen of the GUI, the rule may be based on the size of the selectable user interface elements in the GUI. For example, some user interface screens comprise relatively large selectable user interface elements for which touch point adjustment may not be necessary. For example, the icons 154 of the icon menu selection 152 may be sufficiently large for many users that touch point adjust may not be of assistance. In contrast, the virtual keys 136 of the virtual keyboard 134 are relatively small selectable user interface elements which may be sufficient small for many users that touch point adjustment may be of assistance. Thus, in some embodiments when the current user interface screen of the GUI comprises large UI elements it is not subject to touch point adjustment, and when the current user interface screen of the GUI comprises small UI elements it is subject to touch point adjustment.

A determination as to whether the user interface screen of the GUI is subject to touch point adjustment may be based on a predetermined value or setting associated with the various user interface screen of the GUI which, for example, may be stored in memory 244 of the device 201. In such embodiments, the device 201 need only determine the current user interface screen and the value or setting associated with the current user interface screen to determine whether to apply touch point adjustment. Alternatively, the determination may be made in real-time based on graphics information maintained by graphics rendering software, which may be part of the operating system software 223 or a separate application 225. The graphics information is stored in local memory, typically volatile memory such as RAM 246.

In other embodiments, determining whether the touch point is subject to touch point adjustment comprises identifying the user interface element located at the unadjusted touch point determined in step 1002, and using the size of the user interface element obtained from graphics information maintained by the device 201 to determine whether to adjust the touch point. The determination is made by comparing the size of the user interface element to a predetermined size threshold. The size is defined by the area of the viewing area of the touchscreen 210 which is associated with the respective user interface element. It will be appreciated that the area associated with the user interface element may not be the same as the displayed area of the user interface element. Typically, the area defined by the user interface element will be slightly larger than the displayed text and/or graphics of the respective user interface element.

When the size of the user interface element is greater than or equal to the predetermined size threshold, the touch point is not subject to touch point adjustment. This is because at this size the user interface element is likely not small enough for occlusion to be an issue. When the size of the user interface element is less than the predetermined size threshold, the touch point is subject to touch point adjustment. This is because at this size the user interface element is likely small enough for occlusion to be an issue.

In some embodiments, the predetermined size threshold is 10 mm in either displayed height or width, or an equivalent diameter of 10 mm. In other embodiments, the predetermined size threshold may be 10 mm×10 mm in either displayed height or width. The above-described thresholds approximate the size of the average user fingertip. In this way, onscreen items larger than a fingertip will not be offset, allowing smaller touch items and bigger touch items to be handled more efficiently by the processor 240 and more accurately based on the user's intended target. In other embodiments, other predetermined size thresholds may be used. To further improve touch point adjustment, the predetermined size threshold may be configurable or calibrated to suit a particular device user.

When the active application 225, operational mode of the device 201, or the current user interface screen of the GUI matches a predefined rule for performing touch point adjustment, the touch point will be adjusted and processing proceeds to step 1010. When the active application 225, operational mode of the device 201, or the current user interface screen of the GUI does not match a predefined rule for performing touch point adjustment, the touch point will not be adjusted and processing proceeds to step 1014.

In step 1010, the processor 240 determines the touch offset in accordance with the device orientation and possibly also the touch point. The touch offset is selected from a plurality of predetermined offset values in accordance with the device orientation. One example of touch offset values will be described for the purpose of illustration. When the device 201 is in one of the "top up", "bottom up", "left up" and "right up" device orientations, the touch offset is determined in accordance with the following mappings of touch offset to device orientation shown in Table 3:

TABLE 3

Reference Position/Device Orientation vs. Touch offset

| Reference position/<br>device orientation | First<br>(Top Up) | Second<br>(Bottom Up) | Third<br>(Left Up) | Fourth<br>(Right Up) |
|---|---|---|---|---|
| Touch offset | (0, y1) | (0, −y2) | (x1, 0) | (−x2, 0) |

Device orientations different than those described above could be used in different embodiments, and touch offsets different than those described above could be mapped to the device orientations in different embodiments.

When the device 201 is in either of the "front up" or "back up" device orientation, the input plane of the touchscreen display 210 is generally in the horizontal plane and there is no effective mechanism to unambiguously select a touch offset for the GUI. As a result, when the device 201 is in either in the "front up" or "back up" device orientation, the touch offset is determined as the previous touch offset of the device orientation when the device 201 was last in one of the "top up", "bottom up", "left up" or "right up" device orientations. This is determined from the previous touch offset stored in the memory of the device 201 (typically RAM 246), for example, in a run-time memory used by the user interface module 226. The previous touch offset from such a device orientation, or the previous such device orientation, may be stored in memory by the user interface module 226 for use when the device 201 is in either of the "front up" or "back up" device orientation.

If there is no previous touch offset or device orientation stored in memory 244, for example because the device 201 was turned on while positioned horizontally, e.g. when in the "front up" or "back up" device orientation, a default touch offset is selected. In at least some embodiments, the default touch offset is the touch offset when device 201 is in the "top up" device orientation. A different default touch offset could be used in other embodiments.

After determining the touch offset, one or both of the determined device orientation and touch offset may be stored in memory 244, for example, for use in cases when the device 201 is in either of the "front up" or "back up" device orientations.

Next, in step 1012 the adjusted touch point is determined in accordance with the touch point and the touch offset determined in step 1010. This step comprises calculating the adjusted touch point by subtracting the touch offset to the touch point detected by the touchscreen 210. Where the touch point is the centroid of the contact area on the touchscreen 210 $(X_c, Y_c)$, the adjusted touch point is determined in accordance with the values set forth in Table 4 below.

TABLE 4

Adjusted Touch Point vs. Reference Position

| Reference<br>position/device<br>orientation | Adjusted Touch point | Notes |
|---|---|---|
| Top Up | $(X_c, Y_c - y1)$ | Adjusted touch point is the original touch point adjusted upwards by an amount "y" in the y-axis and unchanged in the x-axis |
| Left Up | $(X_c - x1, Y_c)$ | Adjusted touch point is the original touch point adjusted rightwards by an amount "x" in the x-axis and unchanged in the y-axis |

TABLE 4-continued

Adjusted Touch Point vs. Reference Position

| Reference position/device orientation | Adjusted Touch point | Notes |
|---|---|---|
| Bottom Up | $(X_c, Y_c + y2)$ | Adjusted touch point is the original touch point adjusted downwards by an amount "y" in the y-axis and unchanged in the x-axis |
| Right Up | $(X_c + x2, Y_c)$ | Adjusted touch point is the original touch point adjusted leftwards by an amount "x" in the x-axis and unchanged in the y-axis |

Thus, in the described embodiment, when the device orientation is "top up", a negative "y" touch offset having a value of y1 is used. If the device orientation is "bottom up", a positive "y" touch offset having a value of y2 is used. If the device orientation is "left up", a negative "x" touch offset having a value of x1 is used. If the device orientation is "right up", a positive "x" touch offset having a value of x2 is used. The values of x1 and x2 may be the same for the touch offsets in the "left up" and "right up" device orientations, and the values of y1 and y2 may be the same for the touch offsets in the "top up" and "bottom up" device orientations. The x touch offset values (i.e., x1 and x2) may be the same as the y touch offset values (i.e., y1 and y2) in some embodiments.

Next, in step 1014 the processor 240 selects the user interface element located at the adjusted touch point and generates an input signal associated with the respective user interface element. This may comprise determining the user interface element associated with the adjusted touch point prior to selection, and may comprise determining the input signal associated with the user interface element format prior generating the input signal.

The action performed by the generated input signal depends on the respective user interface element. For example, in a text entry mode, the input signal may be cause a displayable character to be displayed in a corresponding text entry field on the touchscreen 210. In an icon menu selection mode, the input signal may execute an action associated with an icon 154 in the icon menu item 154 which may causes, for example, the processor 240 to launch the application or function logically associated with the icon 154 or to open a folder associated with the icon 154.

Returning to step 1006, when it is determined that touch point adjusted is not to be applied, the processing processed to step 1008. In step 1008, the processor 240 selects the user interface element associated with the unadjusted (original) touch point and generates an input signal associated with the respective user interface element.

The touch offset solution described herein accounts for changes in device orientation by dynamically selecting a touch offset by determining the orientation (or a change in orientation) of the device 201, and determining the required touch offset accordingly. It will be appreciated that without dynamically setting or adjusting the touch offset, the touch offset may not be valid when the device orientation changes. Accordingly, the use of a dynamic touch offset improves the accuracy of touchscreen based input mechanisms. More precise touchscreen based input mechanisms may, in turn, allow smaller sensing areas to be used for user interface elements, thereby allowing more user interface elements to be incorporated within a touchscreen-based graphical user interface.

The touch offset solution, in some embodiments, also takes into account the size of the user interface elements so that if an item which is touched is greater than or equal to a predetermined size, the touch point will not be offset. This may be advantageous because it reduces processing requirements of the device 201 so that touch offset is used only when determined to be necessary by the predefined touch offset rules. The touch offset solution described herein applies to GUIs which change screen orientation based on changes in device orientation, and to GUIs which change screen orientation based on changes in device orientation.

The teachings of the present disclosure can also be applied to change the touch offset to correspond to a change in the screen orientation independent of the device orientation, for example, so that the touch offset is maintained in a specific direction and optionally at a specific distance from the touch input (e.g., the centroid of the contact area) for all screen orientations. Typically, this involves determining the screen orientation of the GUI displayed on the device 201 and selecting a touch offset which adjusts the touch point in a direction opposite to a top of the GUI in the determined screen orientation (for example, so that a downward offset relative to the GUI is maintained). However, a different direction offset could be used for the touch offset in different embodiments. The change in the screen orientation of the GUI may be triggered by a change in device orientation detected by the positional/orientation sensor of the device 201, or in response to respective input, for example, from the user.

While the operations 1000 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

While the terms "touch" and "press" are used in the present disclosure, these terms are used for purposes of illustration only. The present disclosure is intended to apply to any touch input (i.e., any application of an external force to the touchscreen 210) which generates an input signal by the touchscreen display 210. The touch input may be caused by a finger of the user contacting the touchscreen 210, a stylus contacting the touchscreen 210, or the presence of a conductive object near the touchscreen 210 if the touchscreen 210 is a capacitive touchscreen. Moreover, aspects of the present disclosure relating to receiving input via interaction with user interface elements presented on the touchscreen 210 are intended to apply to any interactive user interface element such as an icon, virtual button, virtual key or other interactive user interface element having one or more inputs associated with it.

Communication System Configuration

Figure 1:
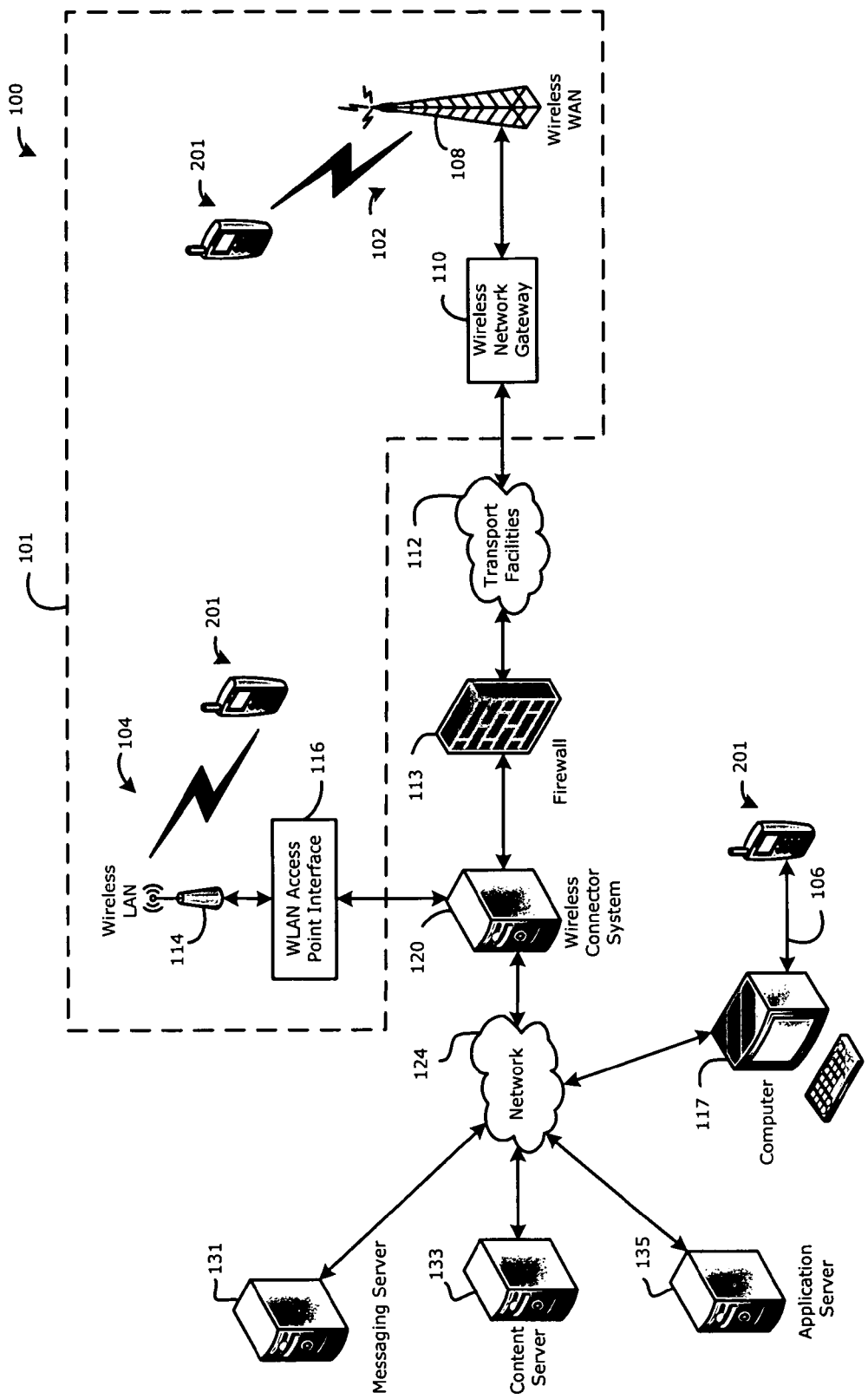
FIG. 1 is a block diagram illustrating a communication system including a mobile communication device to which example embodiments of the present disclosure can be applied.

In order to facilitate an understanding of one possible environment in which example embodiments described herein can operate, reference is made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 131 (for example, a Microsoft Exchange™, IBM Lotus Domino™, or Novell GroupWise™ email server), and a content server 133 for providing content such as Internet content or content from an organization's internal servers, and application servers 135 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 131 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 131, content server 133 or application servers 135. Conversely, the wireless connector system 120 sends data packets received, for example, from the messaging server 131, content server 133 or application servers 135 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 131, content server 133 and application server 135.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method comprising:
   detecting a touch input on a touchscreen display of an electronic device;
   determining a current orientation of the electronic device;
   adjusting a location of touch input by a touch offset based on the current orientation.

2. The method of claim 1, comprising identifying a first orientation of a plurality of predetermined device orientations that is closest to a current orientation.

3. The method of claim 1, comprising
   determining when the first orientation matches a first position of a plurality of reference positions, and identifying a value of the touch offset based on the first position.

4. The method of claim 2, comprising
   identifying a previously utilized value of the touch offset when the first orientation does not match one of the plurality of reference positions.

5. The method of claim 2, comprising identifying a default value of the touch offset when the first orientation does not match one of the plurality of reference positions.

6. The method of claim 1, wherein the touch offset is a predetermined value stored in memory of the electronic device.

7. The method of claim 1, wherein the touch offset is 2 mm to 3 mm.

8. The method of claim 1, comprising identifying the touch offset during calibration of the electronic device.

9. The method of claim 1, wherein the touch offset is selectable.

10. The method of claim 1, wherein adjusting is based on at least one of an active application, an operation mode of the electronic device, and a screen displayed on the touchscreen display.

11. The method of claim 1, wherein the touch offset is based on a detected location of the touch input.

12. A computer-readable medium having computer-readable code executable by at least one processor of the electronic device to perform the method of claim 1.

13. An electronic device comprising:
a touchscreen;
at least one processor coupled to the touchscreen and configured to detect a touch input on a touchscreen of an electronic device, determine a current orientation of the electronic device, and adjust a location of the touch input by a touch offset based on the current orientation.

14. The electronic device of claim 13, wherein the at least one processor is configured to identify a first orientation of a plurality of predetermined device orientations that is closest to the current orientation.

15. The electronic device of claim 14, wherein the at least one processor is configured to determine when the first orientation matches a first position of a plurality of reference positions, and identify a value of the touch offset based on the first position.

16. The electronic device of claim 14, wherein the at least one processor is configured to identify a previously utilized value of the touch offset when the first orientation does not match one of the plurality of reference positions.

17. The electronic device of claim 14, wherein the at least one processor is configured to identify a default value of the touch offset when the first orientation does not match one of the plurality of reference positions.

18. The electronic device of claim 13, wherein the touch offset is a predetermined value stored in memory of the electronic device.

19. The electronic device of claim 13, wherein the at least one processor is configured to identify the touch offset during calibration of the electronic device.

20. The electronic device of claim 13, wherein a location of the touch input is adjusted based on at least one of an active application, an operational mode of the electronic device, and a screen displayed on the touchscreen display.

* * * * *